(12) United States Patent
Driemeyer et al.

(10) Patent No.: US 12,137,006 B1
(45) Date of Patent: Nov. 5, 2024

(54) APPARATUSES AND METHODS INVOLVING DATA-COMMUNICATIONS ROOM PREDICTIONS

(71) Applicant: 8x8, Inc., Campbell, CA (US)

(72) Inventors: Justin Driemeyer, Campbell, CA (US); Manu Mukerji, Campbell, CA (US); Vijai Gandikota, Campbell, CA (US); Soumyadeb Mitra, Campbell, CA (US); Solomon Fung, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 18/086,486

(22) Filed: Dec. 21, 2022

Related U.S. Application Data

(63) Continuation of application No. 16/822,684, filed on Mar. 18, 2020, now Pat. No. 11,539,541.

(60) Provisional application No. 62/820,149, filed on Mar. 18, 2019.

(51) Int. Cl.
| | |
|---|---|
| H04L 12/18 | (2006.01) |
| G06F 16/2457 | (2019.01) |
| G06F 16/9535 | (2019.01) |
| G06F 40/279 | (2020.01) |
| G06F 40/30 | (2020.01) |
| G06N 3/047 | (2023.01) |
| G06N 20/00 | (2019.01) |

(52) U.S. Cl.
CPC .... *H04L 12/1831* (2013.01); *G06F 16/24578* (2019.01); *G06F 16/9535* (2019.01); *G06F 40/279* (2020.01); *G06F 40/30* (2020.01); *G06N 20/00* (2019.01); *G06N 3/047* (2023.01)

(58) Field of Classification Search
CPC ... H04L 12/1831; G06F 40/279; G06F 40/30; G06F 16/24578; G06F 16/9535; G06N 20/00; G06N 3/047
See application file for complete search history.

(56) References Cited

U.S. PATENT DOCUMENTS

| | | | |
|---|---|---|---|
| 6,651,058 B1 * | 11/2003 | Sundaresan | G06F 16/367 707/999.005 |
| 9,824,145 B1 * | 11/2017 | Rohrweck | G06F 16/24578 |
| 2003/0078972 A1 * | 4/2003 | Tapissier | H04N 7/17318 348/E7.071 |
| 2007/0168447 A1 * | 7/2007 | Chen | G06Q 10/107 709/207 |
| 2009/0216734 A1 * | 8/2009 | Aghajanyan | G06F 16/9535 707/999.005 |

(Continued)

*Primary Examiner* — Etienne P Leroux
(74) *Attorney, Agent, or Firm* — Crawford Maunu PLLC

(57) ABSTRACT

Apparatuses and methods concerning providing data-communications room recommendations are disclosed. As an example, one apparatus includes a data-communications server. The data-communications server is configured to provide user-data-communications sessions. The server is also configured to retrieve data-communications messages, which may arise from a plurality of disparate interconnected data-communications systems, and batch the data communications messages for a particular data-communications room together to create a room document. Responding to receipt of a request from a particular user, the server identifies a particular data-communications room for a particular inquiry.

19 Claims, 4 Drawing Sheets

(56) References Cited

U.S. PATENT DOCUMENTS

| | | | | |
|---|---|---|---|---|
| 2014/0172444 A1* | 6/2014 | Moore | ............... | G16B 20/10 |
| | | | | 705/2 |
| 2015/0169538 A1* | 6/2015 | Reynolds | ............ | H04L 12/1822 |
| | | | | 704/9 |
| 2016/0364368 A1* | 12/2016 | Chen | ............... | G06Q 10/107 |
| 2017/0346777 A1* | 11/2017 | Kim | ............... | H04L 51/04 |
| 2018/0018371 A1* | 1/2018 | Miller | ............... | G06F 16/24568 |
| 2018/0109574 A1* | 4/2018 | Vigoda | ............... | G06N 20/00 |
| 2018/0351901 A1* | 12/2018 | Snider | ............... | H04L 51/42 |
| 2019/0052926 A1* | 2/2019 | Waterman | ............ | H04N 21/8455 |
| 2019/0182200 A1* | 6/2019 | Jobanputra | ............ | H04L 67/10 |
| 2020/0004561 A1* | 1/2020 | Kottler | ............... | G16H 20/00 |
| 2020/0220741 A1* | 7/2020 | Sai | ............... | H04L 67/55 |
| 2022/0263783 A1* | 8/2022 | Jang | ............... | H04L 51/42 |

* cited by examiner

US 12,137,006 B1

APPARATUSES AND METHODS INVOLVING DATA-COMMUNICATIONS ROOM PREDICTIONS

OVERVIEW

Various example embodiments are directed to apparatuses, systems, methods of use, methods of making, or materials, such as those described in the claims, description and/or figures herein and the like, all of which form part of this patent document.

Various embodiments are directed to addressing challenges relating to identifying a particular data-communications room among a plurality of data-communications rooms for a particular user and/or inquiry. The particular topic of a data-communications room may not be readily apparent from the available resources. Some rooms may have titles that may be at least somewhat descriptive or suggestive (e.g., tradenames) of their topic but some may not, and private/internal terminology (e.g., internal project names/inside jokes) may be used as room titles. Additionally some rooms or conversations may not be particularly useful for particular individuals. Rooms that begin with a particular communication topic may evolve and the content of the room may no longer be relevant to a particular user. Conversely, a room that was not previously relevant to a particular user may become relevant over a period, as the content of the room evolves over time. The activity that takes place in a room may change over time based on a room's relevancy to users.

Accordingly, various embodiments are directed to addressing challenges relating to the above aspects and others, as may benefit a variety of apparatuses, methods, components and/or related systems comprising or related to data-communications room predictions. Certain embodiments involve apparatuses, methods, systems, circuitries, and the like as exemplified in the following diagrams, aspects of the detailed discussion, and/or the claims.

BRIEF DESCRIPTION OF FIGURES

Various example embodiments may be more completely understood in consideration of the following detailed description in connection with the accompanying drawings, in which.

Figure 1:
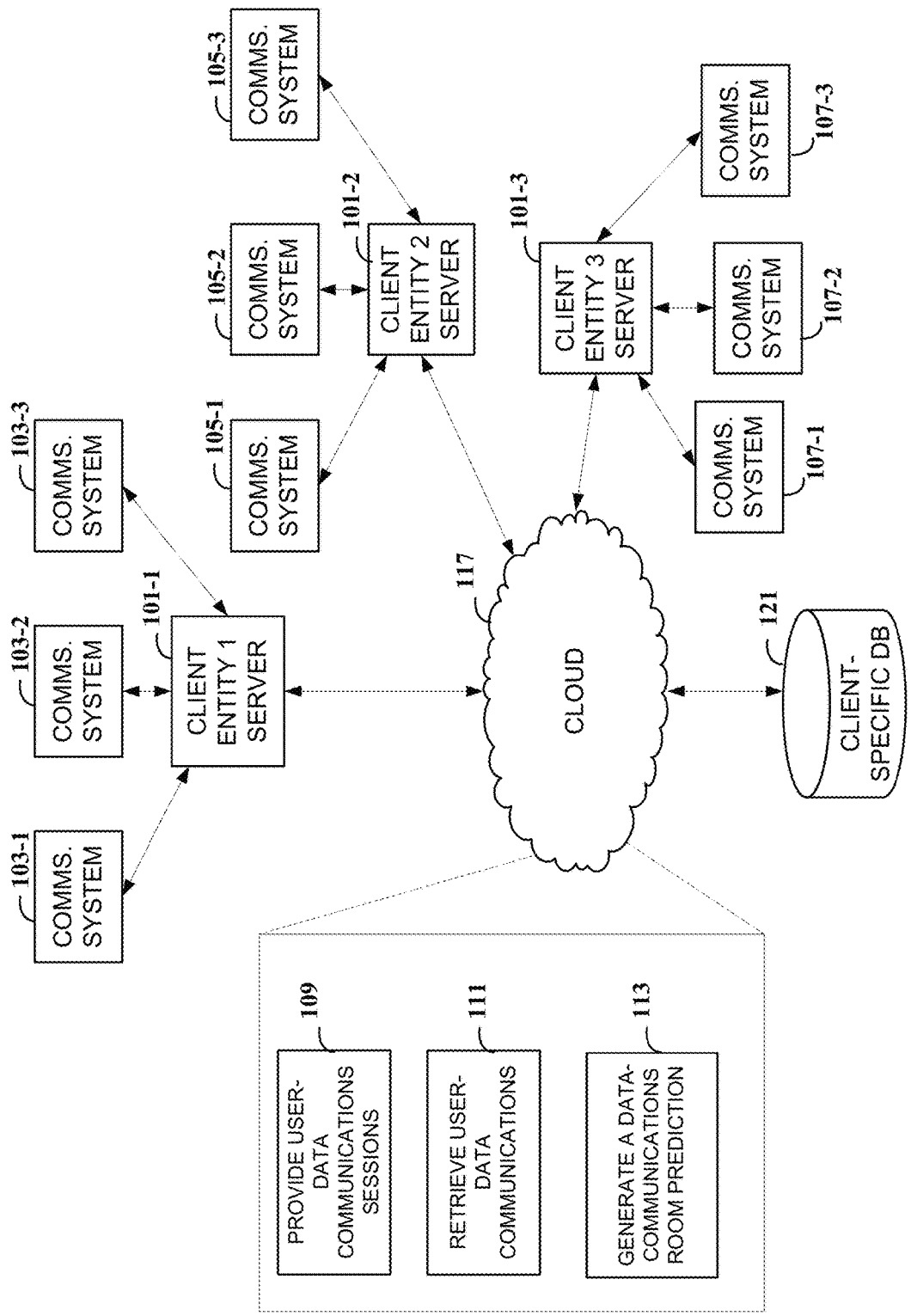
FIG. 1 illustrates a block diagram of an example system for data-communications room predictions, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving data-communications room predictions. In certain implementations, aspects of the present disclosure have been shown to be beneficial when used in the context of providing data communications services. While the present disclosure is not necessarily limited to such data-communications systems as described herein, for purposes of facilitating understanding and appreciation of certain embodiments, the following discussion uses such data-communications-based services and systems in the context and on behalf of communications platforms of client entities which subscribe to such services from a data communications service provider (with a server).

Embodiments are directed toward methods and/or apparatuses for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

Generating data-communications room predictions, in accordance with various example embodiments described herein may include identifying rooms where topics may not be readily apparent from the available resources. Some rooms may have titles that are descriptive, whereas some are not. Additionally, inside names (e.g., private nicknames and/or inside jokes) may be used as room titles. Generating data-communications room predictions, in accordance with various example embodiments described herein may filter out rooms or conversations that are not useful and/or relevant, and may take and/or adopt content from one room versus sections of the conversations. Moreover, generating data-communications room predictions, in accordance with various example embodiments described herein, may consider historical data in order to provide a room recommendation from or to a user, a client and/or a subject matter expert.

As topics may be very domain specific, and use of tribal abbreviations and terms may be common, pre-trained results from other datasets (e.g., Wikipedia) may not be beneficial. Important and/or highly relevant words may sometimes be used very infrequently or insubstantially in the dataset, relative to a threshold, and incorrect recommendations may be provided. Furthermore, generating data-communications room predictions having or starting with no existing dataset for topic queries, for example, may be accomplished. Moreover, interactions that an author, or user, may have with a room may also generate a room recommendation. Accordingly, examples of the present disclosure provide a system for recommending data-communications rooms and/or individuals where a particular user may find additional relevant information related to a query. For instance, a user may be interested in finding a subject matter expert related to a particular computer programming language. The data-communications server may categorize various data-communications rooms, and identify a room and/or particular individual that relates to the particular computer programming language in order to connect the particular user with the particular room and/or the subject matter expert.

In accordance with examples of the present disclosure, systems, methods, and/or apparatuses for generating data-communications room predictions include a communications system involving a data-communications server and a client-managed server, and/or a method of providing aggregated context information for data-communications between the data-communications server and the client-managed server. In such example embodiments, the data-communications server is configured and arranged to provide user data-communications sessions each involving a client-specific endpoint device and another participating endpoint device, where the client-specific endpoint device is associated with a client-entity among a plurality of remotely-situated client entities each respectively configured and arranged to interface with the data-communications server. These data-communications sessions may be attributed to a particular data-communications room or independent of any data-communications room (e.g., prior to being assigned to such a room). The data-communications server retrieves user-data communications (messages) between the client-specific endpoint device and the other participating endpoint device during a first time period. The messages may be retrieved, for example from a plurality of disparate interconnected data-communications systems that provide at least one data-communications service to the client entity on a subscription basis.

The data-communications server batches the data-communications messages for a particular data-communications room together to create a room document for each of a plurality of data-communications rooms. Responsive to receipt of a request from the particular user, the data-communications server identifies a particular data-communications room among the plurality of data-communications rooms for a particular inquiry, based on a comparison of the room document for the particular data-communications room and the request from the particular user. In some example embodiments, the request may be in the form of a formal request from the particular user, such as an inquiry from the user to identify a subject matter expert on a particular subject and/or in a particular field. Examples are not so limited, however, and the request may be in the form of a search engine that identifies topic and/or issues facing the particular user at the particular time, and which provides a recommendation to the particular user based on the present topics and/or issues facing the particular user.

As an illustration, the data-communications server may be configured and arranged to take messages, and filter out known stop words as well as application-specific stop words (e.g., help, issue, question, etc.). The data-communications server may filter out any rooms where 95% of messages were from two or fewer authors, which removes rooms that are mostly just conversations between two people, as well as many testing and/or logging rooms. The data-communications serve may filter out any rooms and/or people with fewer than five messages, for example, which addresses rooms that never really took off. The data-communications server may filter out rooms where the difference between the first and last message was less than or equal to a particular threshold (e.g., 5 days), which removes rooms that were used around a specific event, or addressing a hot issue, for example, but were not intended to be used beyond that. In these and other contexts, the term filter out may refer to removing or otherwise electing to not use particular data sets, rooms, words conversations.

In various example embodiments, the data-communications server is configured and arranged to batch all messages for a room together to create a single room document. The data-communications server is configured and arranged to create a classifier for this, which tries to learn characteristics of what, overall, a room is about. In this context, what a room is about may refer to one or more of a variety of characteristics of the room, such as content-related characteristics as may involve topics of discussion, key words, media characteristics (e.g., imagery and/or audio), as well as other characteristics such as longevity of the room, size, and room participant details such as demographics, age, race, political affiliation, income, and location. Further, the classifier may adjust such characteristics over time, such as to ensure that a time-domain view can be made of a particular room to ensure that classification reflects current room characteristics. Such a classifier may be referred to as a long-term room content classifier.

In some embodiments, this classifier is identified using cosine similarity between a term frequency-inverse document frequency (tf-idf) encoding of the document and a query vector (e.g., a query vector as may be identified and/or received from the particular user and/or on the user's behalf). A tf-idf is a numerical statistic that may reflect how important a word is to a document in a collection or corpus and may increase, for example, proportionally to the number of times a word appears in the document. In such embodiments, cosine similarity may be used to match similar documents based on a counting of a number (e.g., maximum) of common words between the documents, and which may involve comparing respective vectors representing topics and may do so independently of the magnitude of those vectors. Vectors that are common in respective room documents (while perhaps being different in magnitude) may indicate similarity as such.

In various example embodiments, the data-communications server may be configured and arranged to subdivide the single room documents into batches of a plurality of messages, such as 100 messages, for example, so that rooms will have n/100 documents, where n is the number of messages in that room. The data-communications server may train a classifier on those batched messages to predict a room, and may give higher weight to more recent documents. Accordingly, as topics/words discussed in a room may change over time, the data-communications server may update characteristics of the room accordingly with a time-based evaluation. A classifier may thus be implemented relative to a recent timeframe, and may be referred to as providing a short-term room content score. The data-communications server may identify the short-term room content score using tf-idf encoding of the documents and feeding them into a dense neural net in a predictive engine including natural language processing and probabilistic programming, which predicts the respective data-communications room for the particular user. Various embodiments may utilize machine learning libraries such as open source libraries PyTorch, useful with high-level or natural language processing.

In some example embodiments, the data-communications server may combine the long-term room content classifiers and the short-term room content classifier for each respective data-communications room into an ensemble classifier, take the geometric mean of the score of each respective classifier, and generate a room content score for each respective data-communications room. Combining the classifiers may involve, for example, combining some or all characteristics used for each of the long-term and short-term room classifiers into a new (ensemble) classifier.

In some example embodiments, the data-communications server may train a room metadata classifier, using a room name, description or other available room metadata, and generate a room metadata score from the room metadata classifier. In various example embodiments, the room metadata score may be generated using a cosine similarity between a tf-idf encoding of a room name and a query vector. A query vector may include, for example, information from an enquiry about a particular topic as may be provided by a user desiring a match/room for satisfying the enquiry.

In some example embodiments, the data-communications server may combine the room content score and the room metadata score by taking the arithmetic mean of the score of each, and generate a room prediction score from the combined scores. Thereby, the data-communications server may identify the particular data-communications room for the particular user based on the room prediction score.

In some example embodiments, the data-communications server may crawl links included in messages, and pull in the content of the documents referenced and include that in training data. This may bring in trouble-shooting tickets (e.g., JIRA tickets via JIRA software 8.5.1 available from Atlassian of Sydney, Australia), product requirement documents in an integrated word processor (e.g., Google Docs™), customer support tickets, etc.

In some example embodiments, the data-communications server may look at or examine what questions have been asked and who responded to them as an additional dataset for learning subject matter experts. This may involve, for example, questions provided by certain users and answered by others, such as for answering by experts in various fields, in which the experts serve a particular entity via which the users are submitting enquiries. For instance, where users enter technical questions, these questions may be used to create a room or expert score that identifies a room or expert likely to assist in addressing the technical questions. This may be based on classification such as may be characterized herein. In some example embodiments, the data-communications server may implement an entire model in a predictive engine including natural language processing and probabilistic programming (such as PyTorch) that then predicts the respective data-communications room for the particular user and allows the engine to learn the weights for the different models in the ensemble.

In some example embodiments, the data-communications server may use an identification of room participants/contributors to train a room model, and to use an identification of rooms in which participants are involved to help train a person model. Additionally, the data-communications server may pull in other data to train the person model (e.g., engine), as may include information pertaining to job title, meetings attended, meetings hosted, confluence document authored, service tickets authored, and service tickets worked on.

The embodiments and specific applications discussed herein may be implemented in connection with one or more of the above-described aspects, embodiments and implementations, as well as with those shown in the figures.

Turning now to the figures, FIG. 1 illustrates a block diagram of an example system for providing data-communications room predictions, consistent with the present disclosure. Data-communications services may be provided for a plurality of client entities, such as via a data-center communications server. Each client entity may provide the data-communications services to various endpoint devices, as may be implemented in a distributed computing environment. For instance, as illustrated in FIG. 1, a data-center communications server may host via a cloud 117. A plurality of client entities may access the data-center communications server via the cloud 117, such as by a respective client entity server (e.g., client entity 1 server 101-1, client entity 2 server 101-2, and client entity 3 server 101-3).

Each of the respective client entities may be connected in one or more data networks as discussed further herein. Moreover, each of the respective client entity servers 101-1, 101-2, and 101-3 may be communicatively coupled to a plurality of communications systems. For example, client entity 1 server 101-1 may be communicatively coupled to communications systems 103-1, 103-2, and 103-3. Similarly, client entity 2 server 101-2 may be communicatively coupled to communications systems 105-1, 105-2, and 105-3. Further, client entity 3 server 101-3 may be communicatively coupled to communications systems 107-1, 107-2, and 107-3.

Although not illustrated in FIG. 1, each of the client entity servers may be communicatively coupled to a number of endpoint devices. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device may be respectively associated with an account of a respective client. Endpoint devices may be associated with a particular client account by registering the endpoint device with a particular client account serviced by the data-communications server. Registered devices for each client account may be listed in a respective account settings file (not shown) stored by a data-center communications server.

The system illustrated in FIG. 1 further includes one or more processing circuits configured to implement client-specific control engines, which are configured to adjust the data-communications provided for each client account according to a respective set of control directives. For instance, the client-specific control engines can adjust a manner in which endpoint devices are controlled, and/or a manner of routing of a data-communications for a client account, by accessing client-specific sets of control data stored in at least one client-specific database 121.

The server-based communications system illustrated in FIG. 1 may facilitate providing data-communications room predictions, consistent with the present disclosure. In various exemplary embodiments, the data-communications room predictions may be determined by a data-center communications server. Additionally and/or alternatively, the data-communications room predictions may be determined by a client managed server. In either situation, at 109, user-data communications sessions each involving a client-specific endpoint device and another participating endpoint device may be provided, where the client-specific endpoint device may be associated with a client-entity among a plurality of remotely-situated client entities each respectively configured and arranged to interface with the data-communications server. For instance, the data-communications server may provide to each of client entity 1, client entity 2, and client entity 3, data-communications services as described herein. Subsequently, at 111, user-data communications between the client entity and the other party may be retrieved from a plurality of interconnected data-communications systems for a first time period. A context may be determined for each respective user-data communication between the client entity and the other party during the first time period, as described herein. The identification of the context of communications during the first time period may assist with the development of the client-specific database 121, and enable machine learning to assign a context to subsequent user-data communications. As such, a plurality of user-data communications between the client entity and the other party may be aggregated.

At 113, a data-communications room prediction may be generated. The data-communications server may retrieve data-communications messages from the plurality of disparate interconnected data communications systems, batch the data-communications messages for a particular data-communications room together to create a room document for each of a plurality of data-communications rooms, and responsive to receipt of a request from the particular user, identify a particular data-communications room among the plurality of data-communications rooms for a particular inquiry, based on a comparison of the room document for the particular data-communications room and the request from the particular user.

As described herein, a context may represent an overall sentiment of a relationship between at least two parties. The context may be identified based on a number of factors, including keyword, phrase, and/or tone, and may be identified from a single user-data-communication between the parties and/or from an aggregate of user-data communications between the parties. In embodiments where the context may be determined from an aggregate of user-data-communications, projections and/or predictions may be made as to the likely future context between the parties. Additionally and/or alternatively, the context may be displayed for each disparate data-communications system, allowing the viewer to assess the context between the two parties in differing communications platforms.

Figure 2:
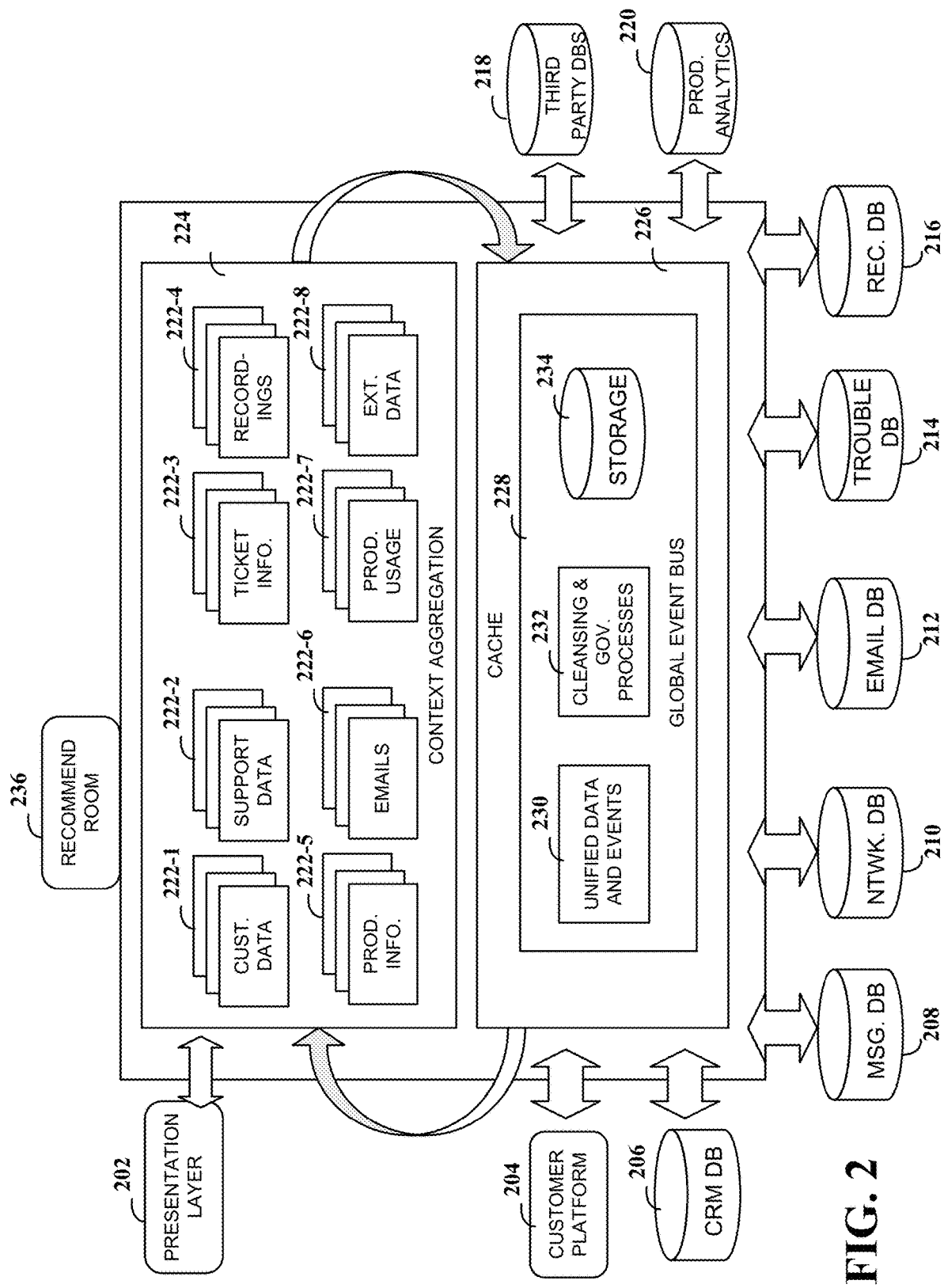
FIG. 2 illustrates a block diagram of an example system of intelligence for context for data-communications room predictions, consistent with the present disclosure.

FIG. 2 illustrates a block diagram of an example system of intelligence for generating a data-communications room prediction, consistent with the present disclosure. The system of intelligence illustrated in FIG. 2 may be implemented by a data-center communications server hosted by a communications service provider, and/or by a client managed server hosted by a client of the communications service provider.

As discussed with FIG. 1, each client entity can be associated with a plurality of interconnected data-communications systems. For instance, each client entity may be associated with a customer relationship management (CRM) system, an email communication system, a product sales system, a text-based communications system (e.g., chat), a technological support system, and/or a data monitoring system. Examples are not so limited, and each client entity may be associated with additional and/or different communications systems beyond those listed. Additionally, the client entity and/or the communications service provider may be communicatively coupled to external (e.g., third party) systems and/or databases.

Referring to FIG. 2, a data cache 226 may store real-time information about all interactions involving the client entity (including the other party). For instance, a global event bus 228, stored in cache 226, may identify and record each interaction and/or event involving the client entity. A unified data and events circuit 230 may store the various data and events involving the client entity, such as emails sent and received, phone calls placed and received, chat messages, etc. A cleansing and governance processes circuit 232 may process the unified data and events as appropriate based on the content of the data. For instance, different encryption and/or data handling processes may be implemented for data and events including health data and/or financial data. A storage circuit 234 may store the various events, information regarding cleansing and governance processes, and other information.

In response to an event occurrence, such as transmission or receipt of a user-data-communication, the cache 226 may be updated. Particularly, the cache 226 may be updated to include an updated context based on the aggregated communications between the client entity and the other party. For instance, the cache 226 may be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user may be retrieved from each of these databases, and stored for context aggregation, such as by a context aggregation circuit 224. As an illustration, to determine a context between user 1 and company 1, information pertaining to customer sales and billing for user 1 may be retrieved from the CRM database 206, service tickets may be retrieved from troubleshooting database 214, and transcripts of voice calls may be retrieved from the recordings database 216. Similarly, to determine a context between user 2 and company 1, information pertaining to customer sales and billing for user 2 may be retrieved from the CRM database 206, service tickets may be retrieved from troubleshooting database 214, and transcripts of voice calls may be retrieved from the recordings database 216.

In various embodiments, data and/or information from each respective database may be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 may be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 may be stored in the context aggregation circuit 224.

Each time that an event occurs involving the client entity and the other party, the cache 226 and context aggregation circuit 224 may be updated. In various example embodiments, a presentation layer 202 may present the room recommendation in various formats. For example, circuitry configured and arranged to communicate with the system of intelligence illustrated in FIG. 2 (e.g., the cache 226 and the context aggregation circuit 224) may present a graphical user interface on a desktop computing device, mobile computing device, and/or tablet, which visually presents the context between the client entity and the other party. The presentation layer 202 may further facilitate the presentation of the recommended data-communications room 236, as identified with FIG. 1.

Figure 3:
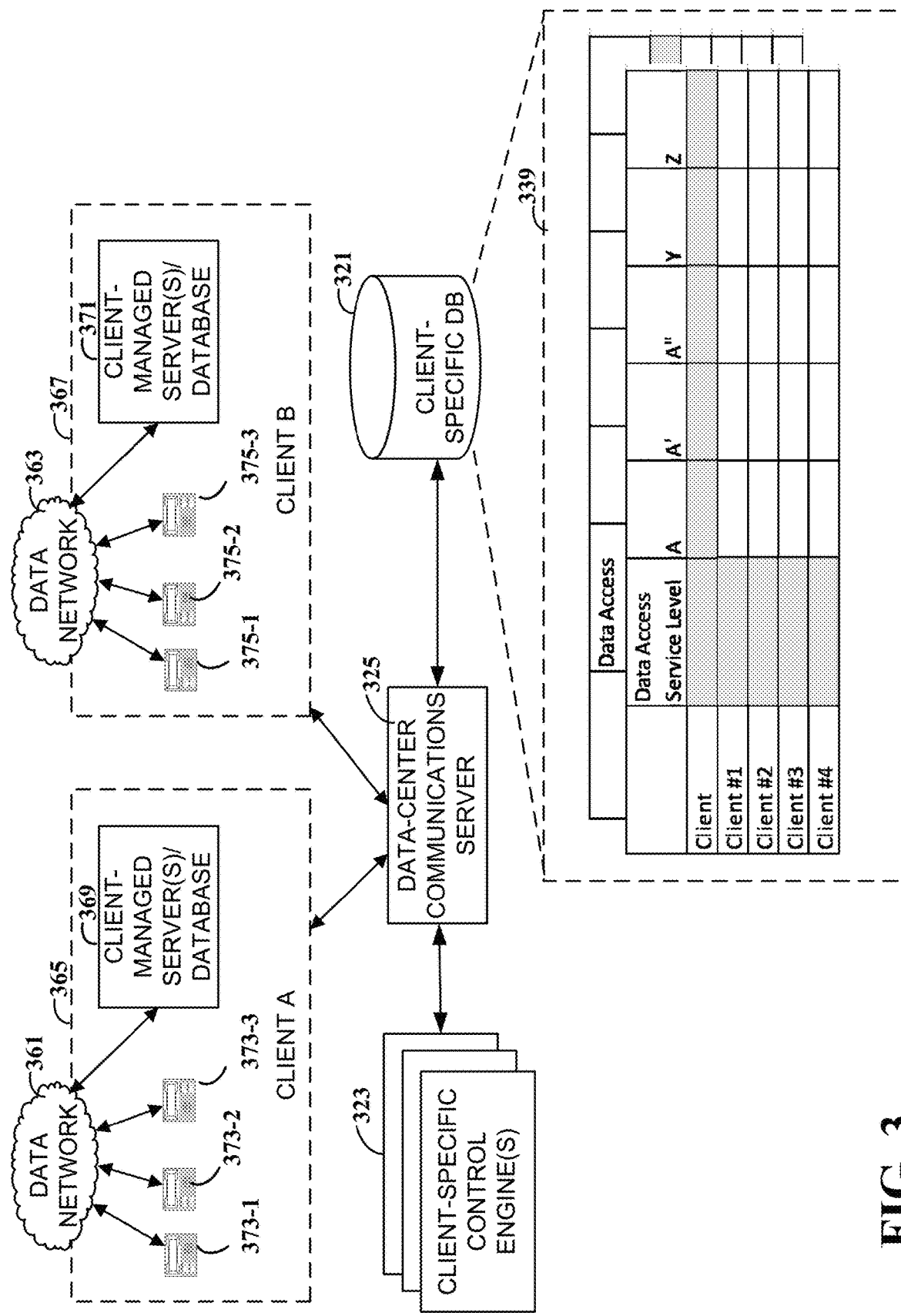
FIG. 3 illustrates a block diagram of an example data communications system for data-communications room predictions, consistent with the present disclosure.

FIG. 3 illustrates a block diagram of an example data-communications system for client-specific data-communications monitoring, consistent with the present disclosure. The system includes a data-center communications server 325 configured to provide data-communications for a plurality of endpoint devices 373-1, 373-2, 373-3, 375-1, 375-2, 375-3 connected in one or more data networks 361 and 363. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device may be respectively associated with an account of a respective client. Endpoint devices may be associated with a particular client account by registering the endpoint device with a particular client account serviced by the data-communications server. Registered devices for each client account may be listed in a respective account settings file (not shown) stored by the data-center communications server 325. In this example, endpoint devices 373-1, 373-2, and 373-3 are associated with an account 365 for a first client A and endpoint devices 375-1, 375-2, and 375-3 are associated with an account 367 for a second client B.

The system includes one or more processing circuits configured to implement client-specific control engines 323, which may be configured to adjust the data-communications provided for each client account according to a respective set of control directives. For instance, the client-specific control engines 323 may adjust a manner in which endpoint devices 373-1, 373-2, 373-3, 375-1, 375-2, and 375-3 are controlled, and/or a manner of routing of a data-communications for a client account, by generating client-specific sets of control data to the data-center communications server 325. For example, the client-specific control engines 323 may generate client-specific sets of control data by processing the respective set of control directives for the account in response to communication event data or other data prompts received from the data-center communications server 325.

As previously described, client-specific control engines 323 may be used to facilitate control of endpoint devices associated with a client device. The control of the endpoint devices may be associated with a variety of virtual office features including, for example, data-communications services such as voice over Internet Protocol (VOIP) calls, audio and/or video conferencing, internet protocol private branch exchange (IP PBX) servers, packet switching, and traffic management as well as non-data communications services including, but not limited to, website hosting, remote data storage, remote computing services, virtual computing environments. One or more of such virtual office features may be provided, for example, by a cloud-computing network having one or more servers configurable to provide a data communications system for a plurality of clients.

Each respective client entity may have a client-managed server and/or database. For instance, client A 365 may be associated with a client-managed server or database 369, whereas client B 367 may be associated with a client managed server or database 371. The client-managed server may facilitate the routing of data-communications between the respective endpoint devices and the data-center communications server. Similarly, the client-managed servers may analyze, in some example embodiments, the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 325 may be communicatively coupled with a client specific database 321, storing service level subscriptions 339 for each of a plurality of client entities. For example, the data-communications service provider may provide a plurality of different service levels for the clients. Each disparate service level may provide additional services and/or information to the client entity, relative to past communications handled and subsequent communications to be handled by the service provider. For example, Client A 365 and Client B 367 may be associated with a home improvement store and an adhesives manufacturer, respectively. Service level A, which can be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population may be willing to spend. Additional service levels (e.g., service level Y and service level Z illustrated in FIG. 2) may be specified. Each respective client entity (e.g., client #1 through client #4) may have a specified level of data service access provided by the data-center communications server 325.

Figure 4:
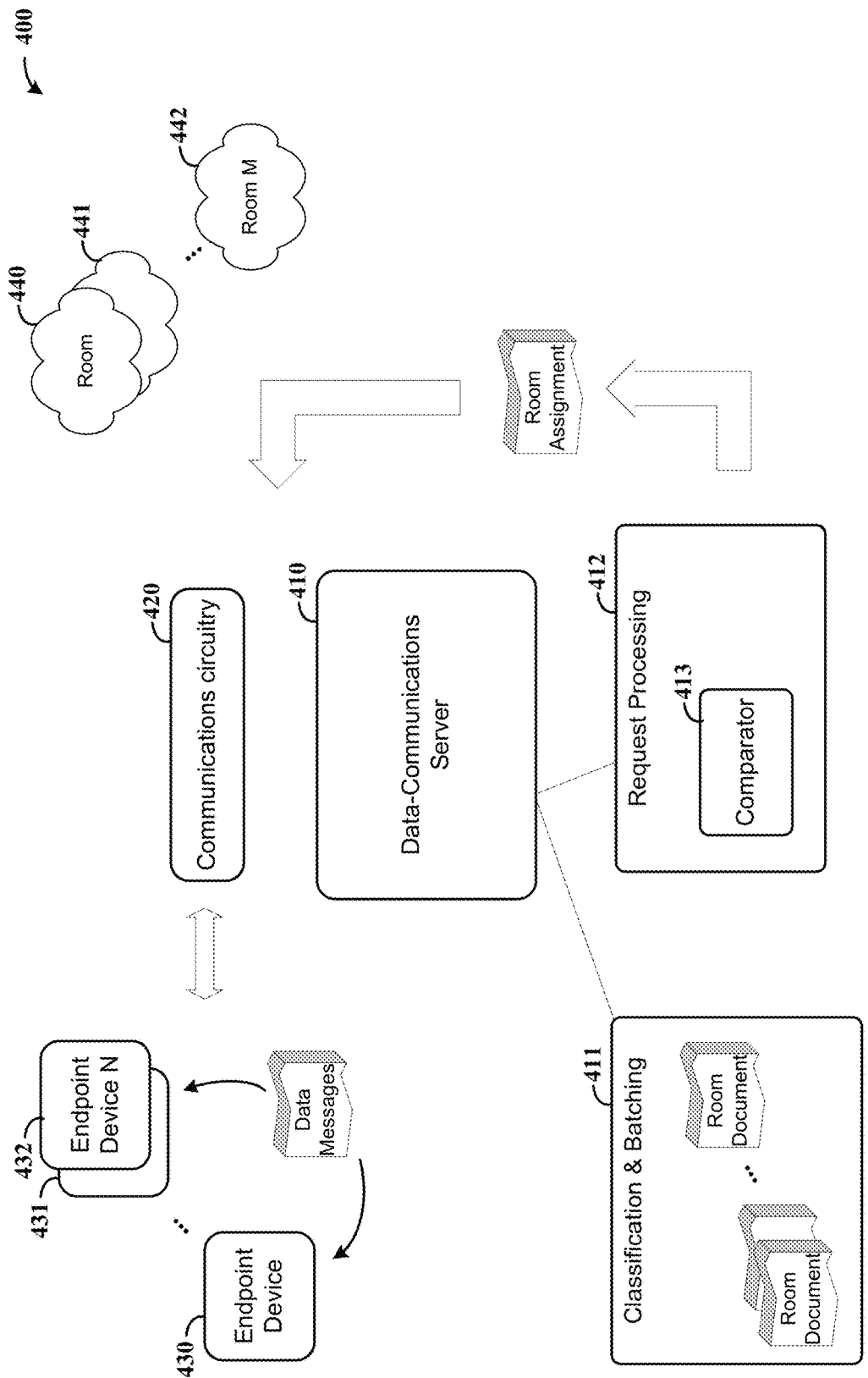
FIG. 4 illustrates an apparatus and approach for assessing and providing data-communications room recommendations, consistent with the present disclosure.

FIG. 4 illustrates an apparatus 400 and approach for assessing and providing data-communications room recommendations, consistent with the present disclosure. The apparatus 400 includes a data-communications server 410 and communications circuitry 420 that interfaces with a plurality of endpoint devices (a number of "N" devices), with endpoint devices 430-432 shown by way of example and as communicating data messages between one another. Notably, a multitude of such endpoint devices (e.g., several hundred or thousand) may communicate in this manner. Such devices may reside and/or be assigned to a particular entity, or may operate across different entities. Such communications may further be carried out using common or disparate communications providers/platforms. Each of the plurality of endpoint devices may be grouped in one or more of a plurality of data communications rooms (a number of "M" rooms), with rooms 440-442 depicted by way of example.

The data communications server 410 includes a classification and batching block 411, which batches data messages into room documents that characterize the rooms 440-442. The classification and batching block 410 may further classify rooms based on data in the room documents, such as to generate long-term and/or short-term classifiers as characterized herein.

The data communications server 410 also includes a request processing block 412 that processes requests received from the endpoint devices 430-432, which may be utilized to associate the request with a particular room and/or with a particular other endpoint device (and related user) for serving the request. The request processing block 412 includes a comparator 413 configured to compare the requests for effecting the association, such as by comparing the requests to the room documents created by classification and batching block 411. This comparison may also utilize classifiers, which may be applied for matching data in the requests with data associated with each room document. For instance, vectors may be created and compared as characterized herein. When matching a request to a room for serving the request (e.g., for matching a user's technical question to a room likely to include individuals that may be able to answer the question), the request processing block 412 may output a room assignment based on the operation of the comparator 413.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer-processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus that refers to or includes otherwise known circuit-based structures. As a first example, a (data-communications) endpoint device (or endpoint) refers to or includes a communications circuit such as one enabled to communicate over a broadband network such as the Internet or a cellular communications network (e.g., computer) processing circuits as configured to establish data-communications sessions with other endpoint devices and such endpoints include, e.g., personal computers, IP-enabled mobile phones, and tablet computers. In addition, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) may be in the form of software stored in and accessible from a memory circuit, and where such circuits are directly associated with one or more algorithms (or processes). Activities pertaining to such algorithms may not be necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules may include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed:

1. An apparatus to provide data-communications room recommendations, the apparatus comprising:
   a data-communications server to interface with each of a plurality of client entities that are respectively associated with client-specific endpoint devices and to:
   provide user-data-communications sessions each involving a client-specific endpoint device and another participating endpoint device;
   retrieve data communications messages between the client-specific endpoint device and the other participating endpoint device during a first time period;
   for each of a plurality of data-communications rooms, batch ones of the data communications messages together to create a room document, filter out certain data-communications from the room document which do not have a set of one or more content-related characteristics in common, and adjust the set of one or more content-related characteristics over time towards ensuring that room characteristics are current;

identify a particular data-communications room among the plurality of data-communications rooms, based on a comparison of the room document for the particular data-communications room and a request from a particular user; and create a long-term room content classifier block for each data-communications room among the plurality of data-communications rooms using a similarity criteria and a query vector.

2. The apparatus of claim 1, wherein each of the plurality of data-communications rooms has a different set of one or more content-related characteristics in common.

3. The apparatus of claim 1, wherein for each of the plurality of data-communications rooms, the data-communications server is to use a long-term classifier to identify the set of one or more content-related characteristics.

4. The apparatus of claim 1, wherein for each of the plurality of data-communications rooms, the set of one or more content-related characteristics includes at least one or more of the following: topics of discussion, key words, and media characteristics.

5. The apparatus of claim 1, wherein for each of the plurality of data-communications rooms, the set of one or more content-related characteristics includes at least one or more of the following: longevity of the room, size, and room participant details such as demographics, age, race, political affiliation, income, and location.

6. The apparatus of claim 1, wherein for each of the plurality of data-communications rooms, the set of one or more content-related characteristics includes at least one or more of the following: topics of discussion, key words, media characteristics, and further includes at least one or more of the following: longevity of the room, size, and room participant details such as demographics, age, race, political affiliation, income, and location.

7. The apparatus of claim 1, wherein the data-communications server is to:

retrieve the data communications messages from a plurality of disparate interconnected data-communications systems that each provide at least one data-communications service to a client entity on a subscription basis.

8. The apparatus of claim 7, wherein the data-communications server is to batch ones of the data communications messages together to create the room document by batching ones of the data communications messages emanating from different ones of the plurality of disparate interconnected data-communications systems.

9. The apparatus of claim 1, wherein the data-communications server is to filter out, from each of the data communications messages, one or more of: known stop-words, application-specific stop-words, and stop-words selected from the group of: help, issue, and question.

10. The apparatus of claim 1, wherein the long-term room content classifier block is configured to learn characteristics of each data-communications room.

11. The apparatus of claim 1, wherein the data-communications server is to train and configure a classifier on the batched data communications messages to predict a room for the particular user, with higher weight given to more recent ones of the batched data communications messages.

12. The apparatus of claim 1, wherein the data-communications server is to determine rooms in which conversations on certain topics are being held during a target timeframe.

13. The apparatus of claim 1, wherein the data-communications server is to use a predictive engine that involves natural language processing and probabilistic programming that predicts a respective data-communications room for the particular user.

14. An apparatus to provide data-communications room recommendations, the apparatus comprising:

a data-communications server to interface with each of a plurality of client entities that are respectively associated with client-specific endpoint devices and to:

provide user-data-communications sessions each involving a client-specific endpoint device and another participating endpoint device;

retrieve data communications messages between the client-specific endpoint device and the other participating endpoint device during a first time period;

for each of a plurality of data-communications rooms, batch ones of the data communications messages together to create a room document, and filter out data-communications from the room document which do not have a set of one or more content-related characteristics in common;

identify a particular data-communications room among the plurality of data-communications rooms, based on a comparison of the room document for the particular data-communications room and a request from a particular user;

train a room metadata classifier block using one or more of: a room name, description, and a set of data related to a room and based on a query that includes information about a particular topic; and generate a room metadata score based on the room metadata classifier block.

15. A method for use with a data-communications server that is configured to provide data-communications room recommendations, the method comprising:

providing user-data-communications sessions each involving a client-specific endpoint device and another participating endpoint device, where the client-specific endpoint device is associated with a client-entity among a plurality of client entities each respectively configured and arranged to interface with the data-communications server;

retrieving data communications messages between the client-specific endpoint device and the other participating endpoint device during a first time period;

batching the data communications messages for a particular data-communications room together to create a room document for each of a plurality of data-communications rooms and processing the room document by filtering out data-communications from the room document which do not have a set of one or more content-related characteristics in common and updating one or more content-related characteristics towards ensuring that room characteristics are current; and identifying a particular data-communications room among the plurality of data-communications rooms for a particular inquiry, based on a comparison of the room document for the particular data-communications room and a request from a particular user.

16. The method of claim 15, further comprising filtering out data-communications rooms where there is a difference between a first one and a last one of the data communications messages, which difference is indicated as at least one of: being less than a threshold number of days, being for a particular event, and being without a specified group of one or more content-related characteristics which are other than those in the set of one or more content-related characteristics.

17. The method of claim 15, further comprising filtering out data-communications rooms or individual users of the data-communications rooms with fewer than a threshold number of messages.

18. The method of claim 15, further including creating a long-term room content classifier block for each data-communications room among the plurality of data-communications rooms using a similarity criteria and a query vector.

19. A storage device including instructions which, in response to being executed by a computing processor circuit, causes a method to be carried out, the method comprising:

providing user-data-communications sessions each involving a client-specific endpoint device and another participating endpoint device;

retrieving data communications messages between the client-specific endpoint device and the other participating endpoint device during a first time period;

for each of a plurality of data-communications rooms, batching ones of the data communications messages together to create a room document and filtering out data-communications from the room document which do not have a set of one or more content-related characteristics in common;

for at least one of the plurality of data-communications rooms, training a room metadata classifier block using a set of data related to a room and based on a query that includes information about a particular topic, and generating a room metadata score based on the room metadata classifier block; and identifying a particular data-communications room among the plurality of data-communications rooms, based on a comparison of the room document for the particular data-communications room and a request from a particular user.

\* \* \* \* \*